May 15, 1956  R. Y. MINER ET AL  2,745,600
ELECTROMECHANICAL COMPUTING APPARATUS
Filed June 28, 1950  2 Sheets-Sheet 1
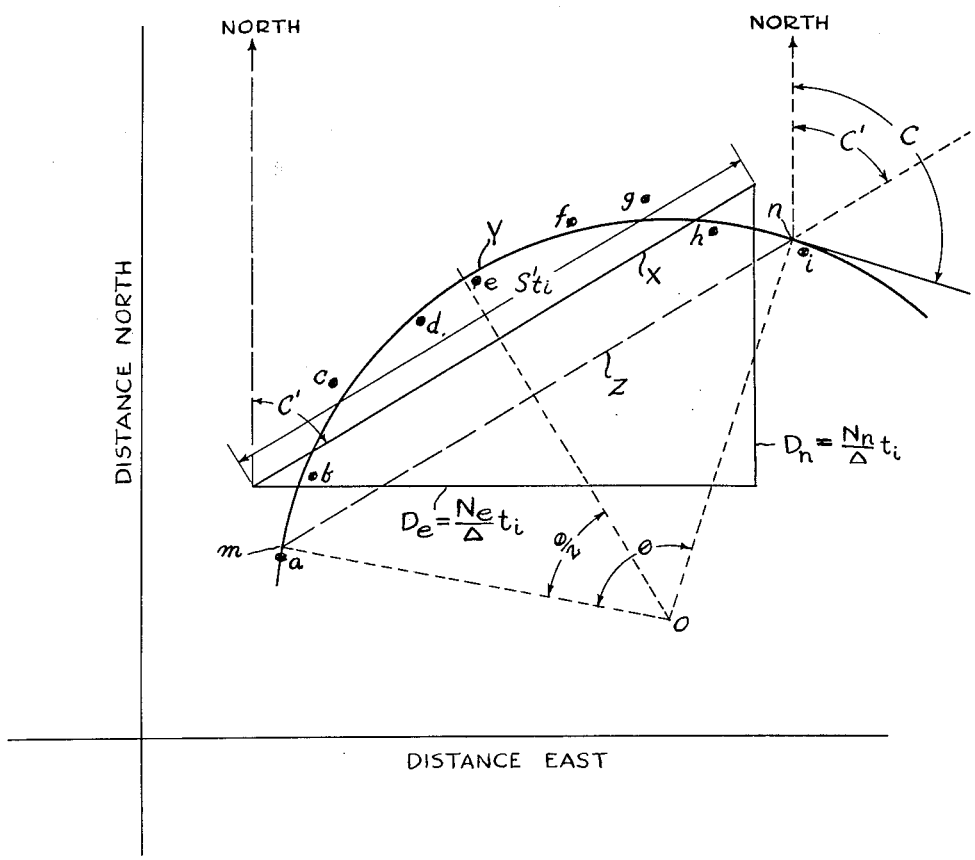
FIG.I.
INVENTORS:
RICHARD Y. MINER, QUENTIN J. EVANS,
& CLIFFORD F. ABT
BY
Their ATTORNEYS.

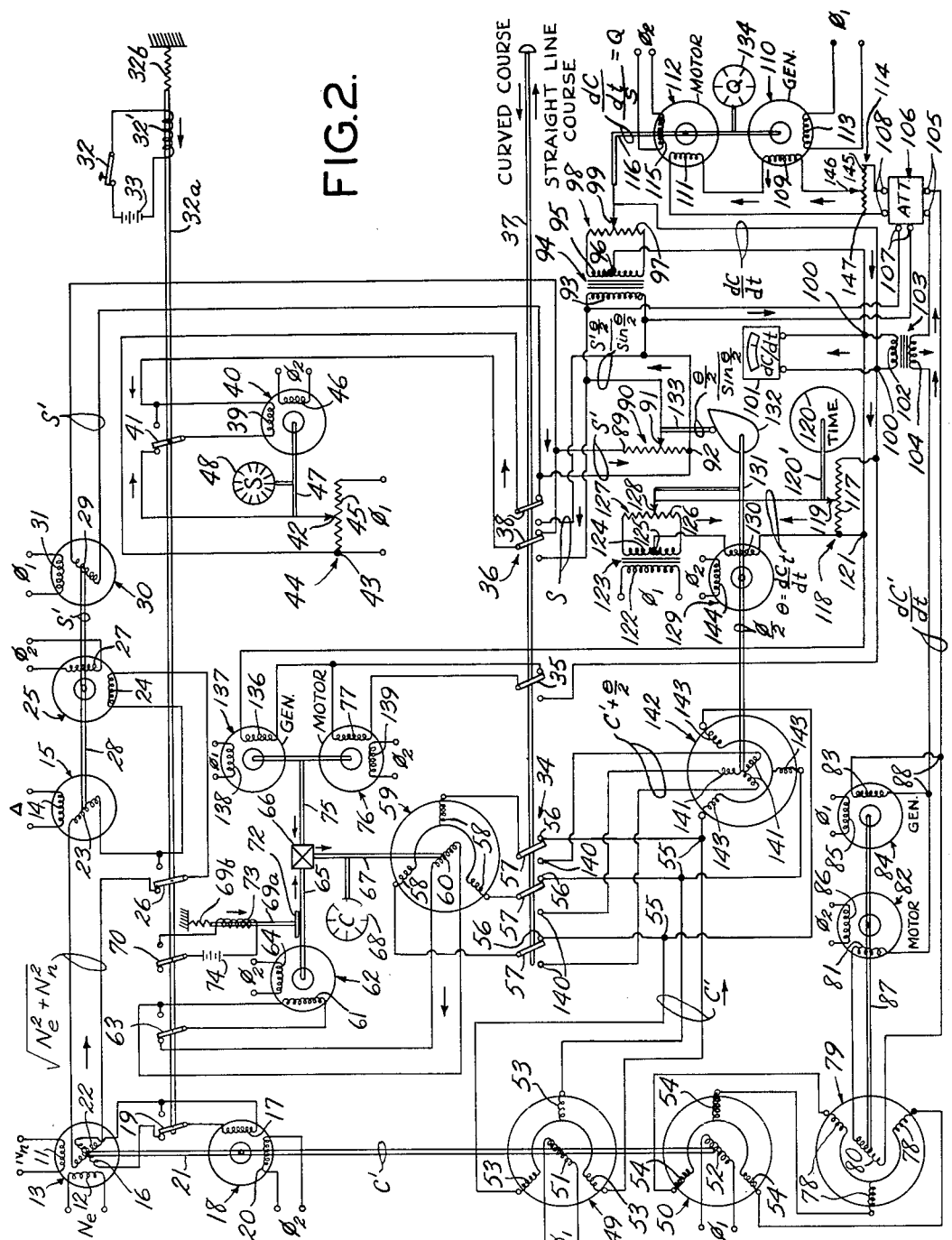

United States Patent Office 2,745,600
Patented May 15, 1956

2,745,600

ELECTROMECHANICAL COMPUTING APPARATUS

Richard Y. Miner and Quentin J. Evans, New York, and Clifford F. Abt, Long Island City, N. Y., assignors to American Bosch Arma Corporation, a corporation of New York Application June 28, 1950, Serial No. 170,846

20 Claims. (Cl. 235—61.5)

This invention relates to an electromechanical computing apparatus, and has particular reference to apparatus for producing a solution of target course and speed from signal input voltages proportional to the numerators and common denominator of the expressions denoting the north and east components of target speed.

The invention is predicated on formulae for the most probable north and east components of target speed obtained from a number of observations of target position made at specific time intervals, and then utilizing some method of curve "fitting," such as the method of least squares for example, assuming a constant speed motion of the target speed north may be expressed as $$\frac{N_n}{\Delta}$$

and the target speed east as $$\frac{N_e}{\Delta}$$

when $N_n$ and $N_e$ are functions of the northerly and easterly components, respectively, of the distance travelled by a target during an interval of time, and $\Delta$ is a function of the time interval. Then the target course, $C'$, is the angle whose tangent is $$\frac{N_e}{N_n}$$

and the speed of the target, $S'$, is the vector sum of $$\frac{N_n}{\Delta} \text{ and } \frac{N_e}{\Delta}$$

or $$\frac{\sqrt{N_e^2 + N_n^2}}{\Delta}$$

The required input signals, proportional in amplitude to the quantities $N_n$ and $N_e$, may be conveniently produced in a circuit such as that disclosed in copending application Serial No. 173,528, filed July 13, 1950, by Richard Y. Miner et al.

In accordance with the invention, such externally produced input signals $N_n$ and $N_e$ are applied to the two stator windings of an electromechanical induction resolver, preferably constructed in the manner described in Patent No. 2,467,646. The rotor of the resolver is automatically positioned so that one rotor winding is aligned with the minimum or null magnetic field, whereby the amplitude of the output voltage induced in the second rotor winding is proportional to $$\sqrt{N_n^2 + N_e^2}$$

and the angular displacement of the rotor is proportional to the target course, $C'$. A voltage, whose amplitude is proportional to $\Delta$, and also produced as described in said copending application, is applied to the stator winding of an induction potentiometer, while the rotor winding output voltage thereof is matched to the $$\sqrt{N_n^2 + N_e^2}$$

signal, so that the rotor displacement is proportional to $$\frac{\sqrt{N_n^2 + N_e^2}}{\Delta}$$

or to the speed $S'$ of the target.

If, on the other hand, the series of observation establish that the target is not travelling in a straight line but is pursuing a curved course, a solution for the target path is obtained by utilizing the $S'$ and $C'$ solutions obtained according to the invention for the straight line path, by assuming that the target is moving on the circumference of a circle at constant speed. Such curved course solution is based on the fact that the best straight line "fitted" through a number of evenly spaced points on the circumference of a circular arc is a line parallel to the chord joining the end points of the arc.

It will be seen that the electromechanical computing apparatus of this invention simply and expeditiously produces solutions of target course and speed for both straight line and curved target course.

For a more complete understanding of the invention, reference may be had to the accompanying diagrams, in which:

Figure 1 is a diagram illustrating the problem for curved target course solution; and Fig. 2 is a schematic wiring diagram of the electrical circuit in which the desired solutions are produced.

Referring now to Fig. 1 of the drawings, a series of observed target positions, taken at substantially equal intervals of time, are plotted as points $a$, $b$, $c$, $d$, $e$, $f$, $g$, $h$, $i$, where $a$ is the initially observed position.

Assuming the target craft to be traveling at constant speed in a straight line, the most probably path of the target through these observed positions is represented by line X. In the apparatus of said copending application, voltages proportional in magnitude to $N_n$, $N_e$ and $\Delta$ are produced, where the ratio $$\frac{N_n}{\Delta}$$

is the northerly component of target speed and $$\frac{N_e}{\Delta}$$

is the easterly component of target speed. The speed, $S'$, of the target along straight line path X is therefore $$\frac{\sqrt{N_n^2 + N_e^2}}{\Delta}$$

and the length of line X is equal to $S't_i$ where $t_i$ is the time interval between the initial and the final ($i$th) observations. The rectangular coordinates $D_e$ and $D_n$ of X are respectively $$\frac{N_e t_i}{\Delta}$$

and $$\frac{N_n t_i}{\Delta}$$

from which the course $C'$ of the target along line X is seen to be the angle whose tangent is $$\frac{N_e}{N_n}$$

However, instead of the straight line X, the path of the target craft may be part of the circumference of a circle, such as arc Y, for these same observed positions. In that case, the solution for the curved path Y is found by assuming that the line X is parallel to, equal in length to, and is displaced perpendicularly from, the chord Z drawn through the initial and final true target positions $m$ and $n$ on arc Y.

The center of curvature of the arc Y is designated as O and the angle through which the target has turned from $m$ to $n$ is designated $\theta$. Analyzing the diagram of Fig. 1 geometrically, the length of arc $mn$ is equal to S'$t$ multiplied by $$\frac{\frac{\theta}{2}}{\sin\frac{\theta}{2}}$$

from which it follows that the target speed S on the curved path Y is equal to straight line path speed S' multiplied by $$\frac{\frac{\theta}{2}}{\sin\frac{\theta}{2}} \text{ or } S = \frac{S'\frac{\theta}{2}}{\sin\frac{\theta}{2}} \quad (1)$$

It is also evident that as the craft moves from $m$ to $n$ along arc Y, the course along the arc changes twice as rapidly as the course of the chord Z. Therefore, it may be stated that the time rate of change of straight path C' is equal to one-half the time rate of change of curved path C, the course along the arc Y, or $$\left(\frac{dC'}{dt}\right) = \left(\frac{1}{2}\right) \cdot \left(\frac{dC}{dt}\right) \quad (2)$$

The central angle $\theta$, in general terms, is equal to the turning rate $$\left(\frac{dC}{dt}\right)$$

multiplied by the elapsed time, $t$, or $$\theta = \left(\frac{dC}{dt}\right) t \quad (3)$$

The curvature of the course Y, or Q, is defined as the radians turned by the target for each yard of travel, and is equal to the turning rate divided by the speed S along the arc Y, or $$Q = \frac{\frac{dC}{dt}}{S} \quad (4)$$

The instantaneous course of the target, between observations, is equal to the tangential course at the last observation plus the change in course since the last observation, and may be expressed as $$C = C' + \left(\frac{dC}{dt}\right)\left(\frac{t_m}{2}\right) + \frac{dC}{dt}(t-t_m) \quad (5)$$

where $t_m$ is the time elapsed betwen the initial and the last or $m$th observations, and $t$ is the total time elapsed since the initial observation.

The foregoing problem solution is effected electromechanically in the computing apparatus of this invention illustrated schematically in Fig. 2, which omits the usual amplifiers, damping devices for the motors, and scaling elements in the interest of simplicity, but it will be understood that such units will be embodied in the instrument.

Referring to Fig. 2, the letters $\phi_1$ and $\phi_2$ designate the phases of a constant two-phase alternating current voltage supply. The input signals proportional to $N_n$, $N_e$ and $\Delta$, derived from $\phi_1$ in a circuit such as that disclosed in said copending application, are applied respectively to stator windings 11, 12 of induction resolver 13, and stator winding 14 of induction potentiometer 15. In the former of these instruments, one or more coils rotates relatively to one or more stationary coils, and when either one or more stationary coils or one or more rotating coils is energized, a voltage is induced in the other whose magnitude depends jointly upon a trigonometric function of the angular relation between them and the input voltage or voltages. In the induction potentiometer, one coil rotates relatively to one stationary coil and the magnitude of the voltage induced in one of these coils upon energization of the other depends jointly on the value of the angular displacement between the coils and the input voltage, for a limited degree of angular rotation.

The instrument of Fig. 2 is placed in the "solving" condition by manually closing switch 32. Although closure of switch 32 is required for either straight line or curved course travel of the target, the solution for target course, C', and target speed, S', for straight line travel will be considered first. Closure of switch 32 energizes winding 32' from power supply 33, so that relay armature 32$a$ is drawn to the left in opposition to restoring spring 32$b$. Relay armature 32$a$ accordingly actuates the movable contacts of single-pole double-throw switches 19, 63, 70, 26 and 41 to engage them with their corresponding left-hand stationary contacts, as is shown in Fig. 2.

Closure of switch 19 electrically connects rotor winding 16 of resolver 13 to control field winding 17 of motor 18, whose main field winding 20 is energized by $\phi_2$, so that motor 18 is energized to drive shaft 21 and the rotor of resolver 13 to the position where the output voltage of rotor winding 16 is zero, thereby deenergizing motor control field winding 17 and stopping motor 18. The displacement of shaft 21 is then proportional to the angle whose tangent is $$\frac{N_e}{N_n}$$

or to the course C' of the straight line target path X, and the amplitude of the output voltage of rotor winding 22 of resolver 13 is proportional to $\sqrt{N_e^2 + N_n^2}$.

Closure of switch 26 by the armature 32$a$ electrically connects the other rotor winding 22 of resolver 13 in series with rotor winding 23 of induction potentiometer 15 and with control field winding 24 of motor 25, so that the voltage at control field winding 24 of motor 25 is the algebraic difference between the output voltages of rotor windings 22 and 23.

Inasmuch as the main field winding 27 of motor 25 is energized from $\phi_2$, this energization of control winding 24 thereof causes motor 25 to drive shaft 28 and the rotor of induction potentiometer 15 to the position where the output voltage of its rotor winding 23 matches the output voltage of rotor winding 22 of resolver 13, so that the control field winding 24 of motor 25 is deenergized, causing the motor to stop. Since the amplitude of the input signal voltage impressed on stator winding 14 of potentiometer 15 is proportional to $\Delta$, and the amplitude of the output voltage of rotor winding 23 thereof is proportional to $\sqrt{N_n^2 + N_e^2}$, matching the output of rotor winding 22, it follows that the displacement of rotor winding 23 and its shaft 28 is proportional to $$\frac{\sqrt{N_n^2 + N_e^2}}{\Delta}$$

the target speed S' along a straight line path, X.

Shaft 28 of motor 25 also drives through angle S' the rotor winding 29 of induction potentiometer 30, the stator winding 31 of which is energized by $\phi_1$, so that the amplitude of the output voltage induced in rotor winding 29 is proportional to S', the target speed along the straight line path, X.

Another series of gang switches are arranged for manual operation in one direction or the other according to whether straight line or curved course of the target is observed. Thus, double-throw gang switches 34, 35 and 36 are operated manually for straight line travel of the target, so that by moving bar 37 to the right they engage their respective right-hand contacts as shown in Fig. 2. In this position, the movable contacts 38 of double pole switch 36 are electrically connected in series with control field winding 39 of motor 40, while switch 41 is in the left-hand position, and also in series with brush 42 and end tap 43 of potentiometer 44, whose resistance winding 45 is energized by $\phi_1$ source. The voltage at control field winding 39 of motor 40 is the algebraic difference between the voltage at contacts 38 and the voltage between end tap 43 and brush 42 of potentiometer 44.

The main field winding 46 of motor 40 is energized from $\phi_2$ source. Hence, upon energization of its control field winding, motor 40 drives shaft 47 and potentiometer brush 42 to the position where the output voltage between taps 42 and 43 of potentiometer 44 matches the input signal to contacts 38, so that control field winding 39 of motor 40 is deenergized and the angular displacement of its shaft 47 is proportional to the amplitude of the signal at contacts 38. For the conditions that obtain in the switch setting shown in Fig. 2, the signal at contacts 38 is the output voltage of rotor winding 29 of induction potentiometer 30, which is S', so that the displacement of shaft 47, indicated on dial 48, is proportional to S', the target speed along straight line X of Fig. 1.

In addition to driving the rotor of induction resolver 13 in the manner described, shaft 21 of motor 18 drives the rotors of self-synchronous transmitters 49 and 50 whose respective rotor windings 51 and 52 are energized from $\phi_1$ and in whose respective stator windings 53 and 54 are induced signal outputs corresponding to the displacement of shaft 21, which is target course C' of the straight line target path X. The output of transmitter 49 is impressed on terminals 55, which are electrically connected to one set of stationary contacts 56 of switch 34, operatively connected to and operated by the course setting bar 37. When on the straight course setting, movable contacts 57 of switch 34 cooperate with stationary contacts 56, as shown in Fig. 2, so that the signal applied to stator windings 58 of self-synchronous control transformer 59 corresponds to straight line target course, C'.

With "solving" switch 32 in closed position, it will be observed that the rotor winding 60 of control transformer 59 is electrically connected through switch 63 to control field winding 61 of motor 62 whose main field winding 64 is energized from $\phi_2$. Motor 62 is connected by shaft 65 to one side of a mechanical differential 66, whose output side drives shaft 67, mechanically connected to the rotor of control transformer 59, to the position where the output voltage of rotor winding 60 is zero, so that the control field winding 61 is de-energized and motor 62 stops. Inasmuch as the stator windings 58 of control transformer 59 were energized in accordance with straight line target course C', the displacement of shaft 67, indicated on dial 68, corresponds to the signal C' at terminals 55.

In order to preserve the straight line solution for C' and S', switch 32 is reopened to deenergize relay winding 32', which releases its armature 32a to enable restoring spring 32b to throw the movable contacts of switches 19, 63, 70, 26 and 41 from their respective left-hand contacts to their respective right-hand contacts. This action of switches 19 and 26 disconnects control field windings 17 and 24 from respective rotor windings 16 and 23, and also short-circuits them during the time that the $N_n$, $N_e$ and $\Delta$ input signals are being revised externally in accordance with the latest target observations.

When "solving" switch 32 is opened to preserve the straight line solution of C' and S', the resulting actuation of switches 63 and 41 by return spring 32b electrically disconnects control field windings 61 and 39 of motors 62 and 40, from rotor winding 60 of control transformer 59 and from rotor winding 29 of potentiometer 30, respectively, and also short-circuits them. Simultaneously, the movement of shaft 32a to the right causes switch 70 to connect brake winding 73 to battery 74 and, in opposition to the restoring spring 69b, to apply brake 69a to shaft 65, forthwith locking it.

The other input side of differential 66 is connected to shaft 75, which is driven by motor 76 and remains stationary when switch bar 37 is positioned to the right for straight line target course, since then switch 35 short-circuits the control field winding 77 of motor 76, as shown in Fig. 2.

Another control transformer in the target course circuit is designated 79, and its stator windings 78 are energized by the C' signal output of stator windings 54 of transmitter 50 and its rotor winding 80 is driven by the shaft 87 of induction motor 82 which also drives linear induction generator 84. Transformer rotor winding 80 is connected in series with control field winding 81 of motor 82 and with the output field winding 83 of generator 84, so that the voltage at motor control field winding 81 is the algebraic difference between the voltage induced in rotor winding 80 and the output voltage of output field winding 83 of generator 84. Main field winding 85 of generator 84 is energized by $\phi_1$ while main field winding 86 of motor 82 is energized by $\phi_2$. It will be seen that motor 82 tends to drive rotor winding 80 into correspondence with the signal C' at stator windings 78, while the output voltage of generator 84 opposes rotation of motor 82, and thus smooths the rotation of its shaft 87.

Inasmuch as the $N_n$ and $N_e$ signals change, the direction of line X changes, so that the signal C' at stator windings 78 is revised at each observation. Accordingly, the output voltage of generator 84 available at terminals 88, is substantially proportional to the first time rate of change of the target course C', or $$\frac{dC'}{dt}$$

It will be observed that the rotor winding 29 of induction potentiometer 30 is also connected across resistance winding 89 of potentiometer 90, whose output between brush 91 and resistor end tap 92 is applied to primary winding 93 of transformer 94. Secondary winding 95 of transformer 94 is electrically connected across resistance winding 97 of potentiometer 98, whose output voltage between its brush 99 and the center tap 96 of secondary winding 95 is applied to terminals 100.

Connected across terminals 100 is the primary winding 102 of a two-to-one step-down transformer 103 whose secondary winding 104 is connected in series with the output terminals 88 of induction generator 83 and also in series with the input terminals 105 of vacuum tube attenuator 106. Accordingly, the amplitude of the voltage applied at terminals 105 of attenuator 106 is the algebraic difference between the amplitudes of the voltage at terminals 88 of generator 83 and the voltage output of secondary winding 104 of transformer 103.

The vacuum tube attenuator 106 is a variable gain amplifier in which the gain is inversely proportional to the amplitude of the signal at control input terminals 107, which in this case is the input voltage of primary winding 93 of transformer 94 as shown in Fig. 2. The output terminals 108 of attenuator 106 are connected across resistance winding 145 of potentiometer 114, the movable contact 146 and end tap 147 of which are electrically connected in series with output field winding 109 of linear induction generator 110 and with the control field winding 111 of motor 112, driving generator 110, so that the control field winding 111 voltage of motor 112 is the difference between the output voltage of potentiometer 114 and the output voltage of generator 110. Main field winding 113 of generator 110 is energized from $\phi_1$ and main field winding 115 of motor 112 is energized from $\phi_2$.

The shaft 116 of motor 112 drives brush 99 of potentiometer 98 to the position where the output voltage of transformer 103 matches the voltage at terminals 88 of generator 84, so that the voltage at input terminals 105 of attenuator 106 becomes zero, and the control field winding 111 of motor 112 is deenergized. Since the output of transformer winding 104 is matched to the $$\frac{dC'}{dt}$$

voltage output of generator 84, the voltage at terminals 100 is proportional to $$\frac{2dC'}{dt}$$

The amplitude of the voltage at terminals 100 is proportional to $$\frac{dC}{dt}$$

which is the turning rate of the target as shown by Equation 2, and may be directly read on the properly calibrated scale of voltmeter 101.

The purpose of attenuator 106 is to smooth the action of the motor 112 in response to the input signal at terminals 105, whereas adjustment of movable contact 146 of potentiometer 114 regulates the time of response, or the time constant, and generator 110 provides damping for motor 112. With this arrangement, the speed of motor 112 is proportional to the signal output of attenuator 106, and the time constant for the system is independent of the value of speed, S.

The voltage at terminals 100 is also applied across resistance winding 117 of potentiometer 118, the movable brush 119 of which is driven by shaft 120' at a constant speed by a suitable device 120, such as a synchronous motor, so that the displacement of contact 119 from end tap 121 is proportional to the elapsed time since the initial observation.

The brush 119 and end tap 121 of potentiometer 118 are connected in series with the center tap 125 of the secondary winding 124 of transformer 123, and also with the brush 128 of potentiometer 127 whose resistance winding 126 is connected across the secondary winding 124 of transformer 123, whose primary winding 122 is connected to $\phi_1$. Also connected in series with brushes 119 and 128, center tap 125 and end tap 121 is the control field winding 130 of motor 129, so that the voltage at control field winding 130 is the difference between the output voltages between brush 119 and end tap 121 of potentiometer 118, and between movable contact 128 and center tap 125 of secondary winding 124.

The main field winding 144 of motor 129 is energized by $\phi_2$. Upon energization of its control field winding 130, motor 129 drives shaft 131 and movable contact 128 of potentiometer 127 in the direction tending to reduce the voltage in control field winding 130 to zero. In this way, the displacement of shaft 131 of motor 129 is kept proportional to the amplitude of the output voltage of potentiometer 118, which is in turn proportional to $$\left(\frac{dC}{dt}\right)t$$

or to the angle $\theta$ through which the target has turned, as shown by Equation 3. By appropriate selection of transformer 123 and potentiometer 127, the displacement of shaft 131 is made proportional to $$\left(\frac{dC}{dt}\right)\frac{t}{2} \text{ or } \frac{\theta}{2}$$

Shaft 131 drives cam 132 whose follower 133 thereby adjusts brush 91 of potentiometer 90 from its zero position by an amount proportional to $$\frac{\frac{\theta}{2}}{\sin\frac{\theta}{2}}$$

and, since the input to potentiometer 90 is proportional to S', the output of potentiometer 90 is proportional to $$\frac{S'\frac{\theta}{2}}{\sin\frac{\theta}{2}}$$

Inasmuch as the input voltage to potentiometer 98 is the output of potentiometer 90, and therefore is proportional to S, the target speed along Y, and the output of potentiometer 98 is proportional to $$\frac{dC}{dt}$$

it follows that the displacement of brush 99 by the shaft 116 of motor 112 is proportional to $$\frac{\frac{dC}{dt}}{S}$$

or Q, the curvature of the target path as shown by Equation 4. This Q displacement of shaft 116 may be read directly on dial 134, which is calibrated to indicate the curvature of the target path.

In order to provide the curved course solutions of target speed and target course on respective dials 48 and 68, switch bar 37 is moved to the left in accordance with the arrow and accompanying legend to that effect on Fig. 2. Thus, switches 34, 35, 36 are thrown oppositely to the positions there illustrated, with the result that the signal voltage at movable contacts 38 of switch 36 is now the output of potentiometer 90, and hence is proportional to S, the target speed along the arc Y, so that shaft 47 is displaced by motor 40 by an amount proportional to S, which is accordingly indicated on dial 48 driven by motor 40.

The corresponding shift of switch 35 removes the short-circuit on control field winding 77 of motor 76 and connects terminals 100 in series therewith and with the output field winding 136 of linear alternating current generator 137, so that the voltage at control field winding 77 is the difference between the voltage at terminals 100 and the output voltage of generator 137, which is driven by motor 76. The main field winding 138 of linear generator 137 is energized from $\phi_1$ and the main field winding 139 of motor 76 is energized from $\phi_2$, so that motor 76 drives shaft 75 of differential 66 at a speed such that the output voltage of generator 137 is substantially equal to the voltage at terminals 100.

Inasmuch as the voltage at terminals 100 is proportional to $$\frac{dC}{dt}$$

as previously noted, the output voltage of generator 137 as driven by motor 76 is substantially proportional to $$\frac{dC}{dt}$$

it follows that the angular displacement of differential output shaft 67, as contributed by shaft 75, is proportional to $$\left(\frac{dC}{dt}\right)t'$$

where $t'=t-t_m$ of Equation 5, and is the time elapsed since "solving" switch 32 was last opened.

The other movable contacts that were shifted to "curved course" position are contacts 57 of switch 34, which engage stationary contacts 140 connected to the rotor windings 141 of self-synchronous differential 142, whose stator windings 143 are energized with signal C', the target course along X, at terminals 55, and the rotor 141 of differential 142 is displaced by shaft 131 by an amount proportional to $$\frac{\theta}{2}$$

so that the output position signals of rotor windings 141 correspond to $$C' + \frac{\theta}{2}$$

which is the course of the path Y at the instant the last observation was made.

Since the displacement of shaft 67, made to correspond to the signal at contacts 57 by motor 62 when "solving" switch 32 is closed, is proportional to $$C' + \frac{\theta}{2}$$

and the opening of switch 32 causes brake 72 to hold shaft 65 stationary, shaft 75 alone drives differential 66 and its output shaft 67 at a rate proportional to $$\left(\frac{dC}{dt}\right)$$

Between observations, therefore, the angular displacement of differential shaft 67 from its zero position is proportional to the instantaneous course C of the target, as expressed by Equation 5, and may be read directly on calibrated dial 68.

Operation of electromechanical computing apparatus of this invention will be readily understood from the foregoing description of operation of its components, but a brief description of a typical operation will be helpful to an appreciation of the comprehensive nature of the apparatus. The theory of the invention is predicated on the method of least squares whereby a curve is fitted to a number of periodic observations of the target position, assuming that the target is moving in a straight line at constant speed, so that the numerators $N_n$ and $N_e$ for the expressions of target speed north $$\frac{(N_n)}{\Delta}$$

and target speed east $$\frac{(N_e)}{\Delta}$$

as functions of the northerly and easterly components of distance travelled by the target and the denominator $\Delta$ as a function of the time interval of travel of the target are determined and used as inputs to the system. These $N_n$ and $N_e$ inputs as electrical signal values are applied to the two stator windings 11 and 12 of the electromechanical induction resolver 13 whose rotor is positioned by motor 18, in accordance with the voltage induced in rotor winding 16, so that the said induced voltage becomes zero, the amplitude of the voltage induced in rotor winding 22 is proportional to $$\sqrt{N_n^2 + N_e^2}$$

and the angular displacement of the rotor is proportional to the target course, $C'$, which is indicated directly on dial 68. The input voltage whose amplitude is proportional to the time factor $\Delta$ is applied to the stator winding 14 of induction potentiometer 15 whose rotor winding 23 is driven by motor 25 to the position such that the voltage induced therein is matched to the $$\sqrt{N_n^2 + N_e^2}$$

signal output of resolver 13, whereby the displacement of rotor winding 23 of potentiometer 15 is proportional to $$\frac{\sqrt{N_n^2 + N_e^2}}{\Delta}$$

or to the speed $S'$ of the target which is indicated directly on dial 48. Where the observations indicate that the target is travelling at the speed $S'$ along the straight line path X of Fig. 1, the length of X is equal to $S't_1$ where $t_1$ is the time interval between the initial and final observations, and the rectangular coordinates $\bar{D}_n$ and $\bar{D}_e$ are $$\frac{N_n t_i}{\Delta}$$

and $$\frac{N_e t_i}{\Delta}$$

respectively, from which the target course $C'$ along X is the angle whose tangent is $$\frac{N_e}{N_n}$$

Where the observations $a$ to $i$ indicate that the target is travelling along a curved path, such as an arc Y in Fig. 1, the chord Z, parallel to and as long as X, is the basis for determining S and C along Y, by assuming that the target is moving at constant speed along the arc whose chord is Z. The radial angle subtended by the chord is $\theta$ so that the length of the arc Y is $$S't_i \frac{\frac{\theta}{2}}{\sin \frac{\theta}{2}}$$

whereby target speed S along arc Y is equal to the straight line path speed $S'$ multiplied by the aforementioned fraction, according to Formula 1. On the premise that the time rate of change of C, the course along the curved path Y, is twice that of the straight path X, the instantaneous course of the target between observations is equal to the course at the last observation plus the change in course since the previous observation, as expressed by Equation 5.

The curvature of the curved target course Y is equal to the turning rate divided by the speed S along arc Y or Q as defined by Equation 4, and indicated directly on dial 134, whereas S and C are indicated directly on dials 48 and 68, respectively. These calculations and indicated values are made effective upon movement of handle 37 to the left when the observation indicates that the target is travelling in a curved course. Thus, the curved course solution is based on the fact that the best straight line "fitted" through a number of evenly spaced points on the circumference of a circular arc is a line X parallel to the chord Z joining the end points $m$ and $n$ of the arc Y of Fig. 1.

Although a preferred embodiment of the invention has been illustrated and described herein, it is to be understood that the invention is not limited thereby, but is susceptible of changes in form and detail within the scope of the appended claims.

We claim:

1. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, third motive means having a control field winding, a third potentiometer having a winding and a cooperating movable element driven by said third motive means, series connections between the outputs of said second and third potentiometers and the control winding of said third motive means to energize the same, and indicating means driven by said third motive means.

2. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby de-energize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, third motive means having a control field winding, a third potentiometer having a winding and a cooperating movable element driven by said third motive means, series connections between the outputs of said second and third potentiometers and the control winding of said third motive means to energize the same, indicating means driven by said third motive means, and a switch in the control field of at least one of said motive means for de-energizing the same.

3. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, a mechanical differential driven by said second motive means, and operative connections between the output of said differential and said control transformer rotor winding for driving the same to non-inductive position.

4. In electromechanical computing apparatus, the combination of a transformer having a pair of energized windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, a mechanical differential driven by said second motive means, operative connections between the output of said differential and said control transformer rotor winding for driving the same to non-inductive position, and means connected to the input of said differential for modifying the drive of said control transformer rotor winding thereby.

5. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, and operative connections between said second motive means and said control transformer rotor winding for driving the same to non-inductive position.

6. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, a mechanical differential driven by said second motive means, operative connections between the output of said differential and said control transformer rotor winding for driving the same to non-inductive position, a self-synchronous differential having rotor windings and stator windings energized by the voltages induced in the stator windings of said transmitter, connections between the rotor windings of said differential and the stator windings of said control transformer, switches interposed in the last-named connections and the connections between the stator windings of said transmitter and control transformer for alternatively energizing the latter from said differential rotor windings and said transmitter stator windings, third motive means for driving the rotor windings of said self-synchronous differential, a first potentiometer having a winding and a cooperating movable element driven by said third motive means, fourth motive means operatively connected to the input of said mechanical differential for modifying the rotation of the rotor of said control transformer by said second motive means, a second potentiometer having a winding and a movable element driven in accordance with a predetermined time factor, a common source of power for said second potentiometer and said fourth motive means, series connections between the outputs of said first and second potentiometers and the input to said third motive means, a second switch interposed between said source and said fourth motive means, and mechanism connected to said switches for simultaneously actuating the same.

7. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self synchronous transmitter having an energized rotor winding driven by said motive means and stator windings, a self-synchronous differential having a rotor winding and stator windings energized by the voltages induced in the stator windings of said transmitter, second motive means operatively connected to the rotor winding of said differential, a control transformer having stator windings energized by the voltage induced in said differential rotor windings and a rotor winding, third motive means energized by the voltage induced in said control transformer rotor winding, a mechanical differential driven by said third motive means, operative connections between the output of said mechanical differential and said control transformer rotor winding for driving the same to non-inductive position.

8. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means connected to said control transformer rotor winding, operative connections between said second motive means and said control transformer rotor winding for driving the same to non-inductive position, and a switch in said connections between said second motive means and control transformer rotor winding for disabling said second motive means.

9. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings and a rotor winding, second motive means electrically connected to said control transformer rotor winding, operative connections between said second motive means and said control transformer rotor winding for driving the same to non-inductive position, a self-synchronous differential having stator windings energized by the voltage induced in said transmitter stator windings and rotor windings, third motive means having an energized field winding, operative connections between said third motive means and the rotor windings of said self-synchronous differential, and electrical connections between the rotor windings of said differential and the stator windings of said control transformer.

10. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means connected to said control transformer rotor winding, operative connections between said second motive means and said control transformer rotor winding for driving the same to non-inductive position, a self-synchronous differential having stator windings energized by the voltage induced in said transmitter stator windings and rotor windings, third motive means having an energized field winding, operative connections between said third motive means and the rotor windings of said self-synchronous differential, and switching means interposed in the connections between the transmitter stator windings and the stator windings of said control transformer and between the stator windings of said control transformer and the rotor windings of said differential for alternatively connecting said control transformer stator windings to said transmitter stator windings and to said differential rotor windings.

11. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings and a rotor winding, second motive means energized by the voltage induced in said control transformer rotor winding, operative connections between said second motive means and said control transformer rotor winding for driving the same to non-inductive position, a self-synchronous differential having stator windings energized by the voltage induced in said transmitter stator windings and rotor windings, third motive means having a control winding, a source of power connected to said control winding, a potentiometer interposed in said last-named connection and having a winding and a cooperating movable member, operative connections between said third motive means and said movable member for driving the latter to reduce the voltage in said control winding, operative connections between said third motive means and the rotor windings of said self-synchronous differential, and electrical connections between said differential rotor windings and said control transformer stator windings.

12. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, operative connections between said second motive means and said control transformer rotor winding for driving the same to non-inductive position, a self-synchronous differential having stator windings energized by the voltage induced in said transmitter stator windings and rotor windings, third motive means having a control winding, a source of power connected to said control winding, a potentiometer interposed in said last-named connection and having a winding and a cooperating movable member, operative connections between said third motive means and said movable member for driving the latter to reduce the voltage in said control winding, operative connections between said third motive means and the rotor windings of said self-synchronous differential, and switching means interposed in the connections between the transmitter stator windings and the stator windings of said control transformer and between the stator windings of said control transformer and the rotor windings of said differential for alternatively connecting said control transformer stator windings to said transmitter stator windings and to said differential rotor windings.

13. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means energized by the voltage induced in said control transformer rotor winding, operative connections between said second motive means and said control transformer rotor winding for driving the same to non-inductive position, a self-synchronous differential having stator windings energized by the voltage induced in said transmitter stator windings and rotor windings, third motive means having a control winding, a source of power, a second transformer having a primary winding connected to said source and a secondary winding connected to said control winding, a potentiometer having a winding connected across the secondary winding of said second transformer and a cooperating movable member, a second potentiometer having a winding and a cooperating movable member driven in accordance with a predetermined time factor, series connections between the outputs of said potentiometers and said control winding, operative connections between said third motive means and said movable member of said first-named potentiometer for driving the latter to reduce the voltage in said control winding, operative connections between said third motive means and the rotor windings of said self-synchronous differential, and switching means interposed in the connections between the transmitter stator windings and the stator windings of said control transformer and between the stator windings of said control transformer and the rotor windings of said differential for alternatively connecting said control transformer stator windings to said transmitter stator windings and to said differential rotor windings.

14. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a third potentiometer having a winding energized by the output of said second potentiometer and a movable member, a second transformer having a primary winding energized by the output of said third potentiometer and a secondary winding, a fourth potentiometer having a winding connected to the output of said second transformer secondary winding and a cooperating movable member driven in accordance with a predetermined time factor, a fifth potentiometer having an energized winding and a cooperating movable member, third motive means having a control winding, series connections between the outputs of said fourth and fifth potentiometers and the control winding of said third motive means, and operative connections between said third motive means and the movable member of said fifth potentiometer.

15. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a third potentiometer having a winding energized by the output of said second potentiometer and a movable member, a second transformer having a primary winding energized by the output of said third potentiometer and a secondary winding, a fourth potentiometer having a winding connected to the output of said second transformer secondary winding and a cooperating movable member, a fifth potentiometer having an energized winding and a cooperating movable member, third motive means energized by the difference between the output voltages of said fourth and fifth potentiometers, operative connections between said third motive means and the movable member of said third and fifth potentiometers, and time-controlled means operatively connected to the movable member of said fourth potentiometer for modifying the input to said third motive means.

16. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a third potentiometer having a winding energized by the output of said second potentiometer and a movable member, a second transformer having a primary winding energized by the output of said third potentiometer and a secondary winding, a fourth potentiometer having a winding connected to the output of said second transformer secondary winding and a cooperating movable member driven in accordance with a predetermined time factor, a fifth potentiometer having an energized winding and a cooperating movable member, third motive means energized by the difference between the output voltages of said fourth and fifth potentiometers, operative connections between said third motive means and the movable member of said fifth potentiometer, a cam driven by said third motive means, and operative connections between said cam and the movable member of said third potentiometer.

17. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a third potentiometer having a winding energized by the output of said second potentiometer and a movable member, a second transformer having a primary winding energized by the output of said third potentiometer and a secondary winding, a fourth potentiometer connected across the secondary winding of said second transformer and having a movable member, a fifth potentiometer having a winding connected to the output of said fourth potentiometer and a cooperating movable member driven in accordance with a predetermined time factor, a sixth potentiometer having an energized winding and a cooperating movable member, third motive means energized by the difference between the output voltages of said fifth and sixth potentiometers, operative connections between said third motive means and the movable members of said third and sixth potentiometers, a seventh potentiometer having a winding connected to the output of said fourth potentiometer, an electrical generator, fourth motive means energized by the difference between the output voltages of said seventh potentiometer and said generator, driving connections between said fourth motive means and said generator, and operative connections between said fourth motive means and the movable member of said fourth potentiometer.

18. In electromechanical computing apparatus, the combination of a transformer having a pair of energized primary windings and a secondary winding angularly movable in the field of said primary windings, motive means energized by the voltage induced in said secondary winding, operative connections between said motive means and said secondary winding for moving the same to non-inductive position in said field, a self-synchronous transmitter having an energized rotor winding driven by said motive means and stator windings, a control transformer having stator windings energized by the voltage induced in said transmitter stator windings and a rotor winding, second motive means having a control winding, a generator driven by said second motive means, series connections between the output of said generator, the control winding of said second motive means and said control transformer rotor winding, and operative connections between said second motive means and said control transformer rotor winding.

19. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a second transformer having a primary winding connected to the rotor winding of said second potentiometer and a secondary winding, a third potentiometer having a winding connected to the output of said second transformer seondary winding, a third transformer having a primary winding energized by the output of said third potentiometer and a secondary winding, a self-synchronous transmitter having an energized rotor winding driven by said first motive means, a control transformer having stator windings energized by the voltage induced in the stator windings of said transmitter and having a rotor winding, third motive means having a control winding, a generator driven by said third motive means, series connections between the output of said generator and the control winding of said third motive means and said control transformer rotor winding, and operative connections between said third motive means and the rotor winding of said control transformer.

20. In electromechanical computing apparatus, the combination of a transformer having a pair of primary windings severally energized by voltages in accordance with corresponding signal inputs and a pair of secondary windings angularly movable in the field of said primary windings for inducing a corresponding voltage in said secondary windings in accordance with their angular positions in said field, motive means energized by the voltage induced in one of said secondary windings, operative connections between said motive means and said secondary windings for angularly moving said one secondary winding to non-inductive position in said field to thereby deenergize said motive means, second motive means having a control field winding, a potentiometer having a rotor winding and a stator winding energized by a signal input, series connections between the other of said secondary windings and said control field winding and said potentiometer rotor winding, a second potentiometer having an energized stator winding and a rotor winding, operative connections between said second motive means and said first and second potentiometer rotor windings for rotating the same, a second transformer having a primary winding connected to the rotor winding of said second potentiometer and a secondary winding, a third potentiometer having a winding connected to the output of said second transformer secondary winding, a third transformer having a primary winding energized by the output of said third potentiometer and a secondary winding, a self-synchronous transmitter having an energized rotor winding driven by said first motive means, a control transformer having stator windings energized by the voltage induced in the stator windings of said transmitter and having a rotor winding, third motive means having a control winding, a generator driven by said third motive means, series connections between the output of said generator and the control winding of said third motive means and said control transformer rotor winding, operative connections between said third motive means and the rotor winding of said control transformer, fourth motive means having a control winding energized by the difference between the voltage outputs of said third transformer and said generator, and operative connections between said fourth motive means and said third potentiometer for adjusting the same.

References Cited in the file of this patent

UNITED STATES PATENTS

| | | |
|---|---|---|
| 2,465,624 | Agins | Mar. 29, 1949 |
| 2,467,646 | Agins | Apr. 19, 1949 |
| 2,497,216 | Greenough | Feb. 14, 1950 |
| 2,519,180 | Ergen | Aug. 15, 1950 |